United States Patent [19]
Hoffman

[11] 3,848,901
[45] Nov. 19, 1974

[54] FLUID LINE JOINT FOR A VALVE BASE PLATE

[75] Inventor: Robert K. Hoffman, Plainwell, Mich.

[73] Assignee: Parker-Hannifin Corporation, Cleveland, Ohio

[22] Filed: July 9, 1973

[21] Appl. No.: 377,209

[52] U.S. Cl. ............ 285/137 R, 137/271, 285/334.5
[51] Int. Cl. .............................................. F16l 39/00
[58] Field of Search ....... 285/137 R, 334.5; 137/271

[56] References Cited
UNITED STATES PATENTS

| | | |
|---|---|---|
| 1,165,977 | 12/1915 | Kindervater ................ 285/137 R X |
| 3,133,753 | 5/1964 | Goodman et al. .......... 285/137 R X |
| 3,471,178 | 10/1969 | Roe ................................ 285/137 R |
| 3,487,848 | 1/1970 | Leibfritz et al. ..................... 137/271 |
| 3,604,733 | 9/1971 | Hubbell .......................... 285/334.5 |
| 3,758,138 | 9/1973 | Roseman ..................... 285/137 R X |

*Primary Examiner*—H. Hampton Hunter
*Attorney, Agent, or Firm*—John N. Wolfram

[57] ABSTRACT

A joint between a fluid line fitting and a base plate for a valve. The fitting is press fitted into a bore in the base plate and has a flange at its inner end that engages an inner face of the base plate and a gasket that is interposed between the base plate and the body of the valve. The flange prevents pull out of the nipple from the base plate and also seals against the gasket thereby sealing of the press fit connection between the fitting and base plate is obviated.

4 Claims, 4 Drawing Figures

PATENTED NOV 19 1974 3,848,901

FLUID LINE JOINT FOR A VALVE BASE PLATE

BACKGROUND OF THE INVENTION

This invention pertains to a method of attaching fluid line fittings to a base plate for a valve. A valve with a base plate to which fluid lines directing fluid to and from the valve is shown, for example, in U.S. Pat. No. 3,487,848. In this patent, the base plate has side openings for connection to fluid lines, but in a prior modification of this base plate the openings for connection to fluid lines are straight through the plate from the face that is clamped against the valve body to an opposite outer face. Also in such prior construction, fluid line fittings have been press fitted into the base plate openings with the press fit serving to both seal the joint between the fitting and the base plate and to securely attach the fitting to the plate. However, such press fit fittings have been difficult to seal, have required close dimensional tolerances to insure a secure press fit within the base plate openings, and have also required special inspection and test procedures to ascertain proper sealing and attachment relative to the base plate.

SUMMARY OF THE INVENTION

In the present invention, the fluid line fitting has a thin relatively flexible flange at its inner end, a knurled cylindrical shank adjacent to flange, and a fluid line attachment portion at its outer end that is of less diameter than the knurled shank. The fitting is press fitted into the straight-through opening of the valve base plate by inserting the fitting into the opening from the inner face of the base plate until the nipple engages such inner face. The knurl, which is in the form of longitudinally extending ribs similar to a spline, permits the base plate opening and the initial diameter of the fitting shank before the knurling operation to be manufactured to looser tolerances than is the case when the fitting shank is press fitted into the base plate opening without knurling.

The thin relatively flexible flange permits the latter to adjust itself to fit flat against the inner face of the base plate and to present a smooth flat oter face for sealing engagement with a rubber sheet gasket disposed between the base plate and the valve body.

The flange outer face is flat and planar from its outer diameter to an inner diameter defined by a bore through the fitting, and the radial width of the flange between its outer diameter and the fitting bore preferably is at least twice the wall thickness of the shank portion to provide an adequate sealing area for contact with the rubber gasket.

DESCRIPTION

FIG. 1 generally illustrates a valve with a base plate to which fluid line fittings are attached.

Figure 1:
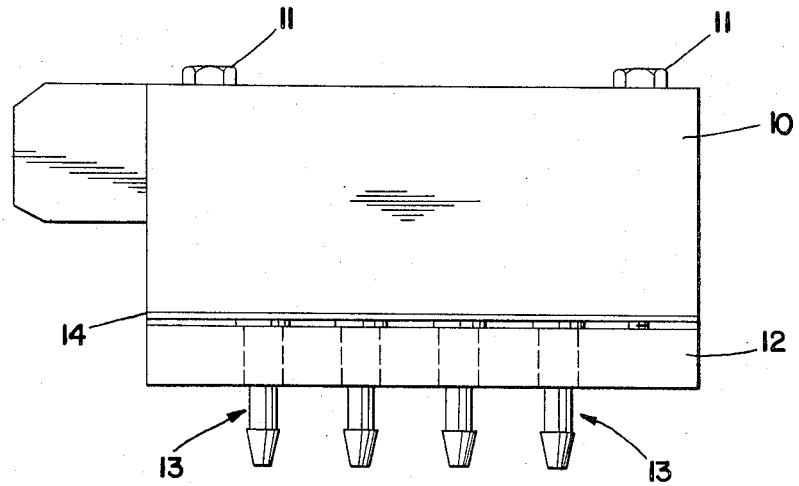
Figure 4:
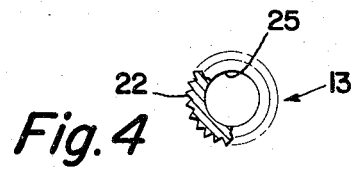
FIG. 4 is a view along the lines 4 — 4 of FIG. 3.

As shown in FIG. 1, a valve body 10 has attached thereto by bolts 11 a base plate 12. Connected to the base plate are several fluid line fittings 13. Between the valve body and base plate is a rubber sheet gasket 14.

Figure 2:
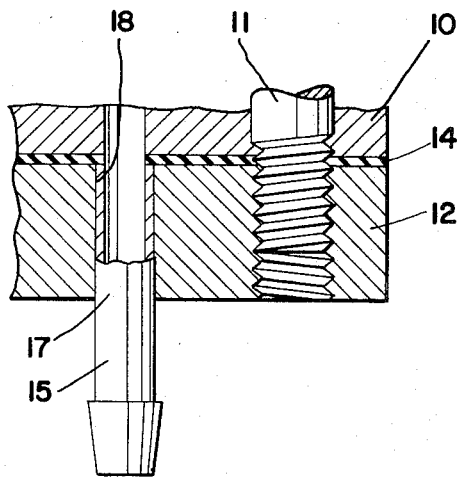
FIG. 2 is a section view through a portion of the valve and base plate illustrating a prior joint between the fluid line fitting and the base plate.

As shown in FIG. 2, a method of forming and attaching a prior design of fluid line fitting to a base plate 12 comprised forming a smooth cylindrical shank 17 on fitting 15 and press fitting the shank into a bored opening 18 through plate 12 with the inner end of shank 17 flush with the inner face 19 of the plate. Because it is difficult to maintain this alignment accurately in production, it has been necessary to make the press fit between shank 17 and bore 18 fluid tight in order to avoid leakage therebetween in instances when the inner end of shank 17 was slightly below face 19 and therefore not in good sealing contact with gasket 14. Because a seal between the press fitted parts was required, the shank 17 had to be a smooth cylindrical surface, and further to insure a fluid tight press fit with adequate grip to prevent dislodgement of fitting 15 from base plate 12, the diameters of bore 18 and shank 17 were required to be made within close tolerances.

Figure 3:
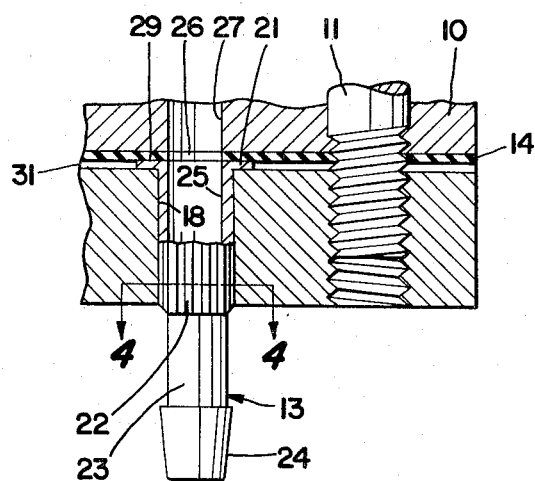
FIG. 3 is a view like FIG. 2 except showing the joint of the present invention between the fitting and base plate.

These difficulties with the prior design of FIG. 2 are avoided with the arrangement of the present invention illustrated in FIG. 3. In the latter arrangement, the base plate 12 has a bored opening 18 therethrough as before. A fluid line fitting 13 has a flange 21 at its inner end, an adjacent knurled shank 22, a reduced diameter portion 23, and at its outer extremity has a barb 24 which may be inserted into a flexible hose that is to be attached to the fitting.

Fitting 13 has a bore 25 therethrough that is in alignment with an opening 26 and gasket 14 and a flow port 27 within valve body 10.

The axially outer face 29 of flange 21 is flat and planar and extends from the outer diameter of flange 21 to an intersection with bore 25. The flange is relatively thin so that it can be deformed slightly for making an intimate flat contact with the inner face 31 of plate 12. The radial width of flange outer face 29 is preferably between two and three times the wall thickness of shank 22.

Shank 22 is of slightly larger diameter than hose attachment means 24 and has axially extending ribs and grooves that constitute a knurled surface for shank 22.

Flange 21 has an axial thicness, for example, on the order of 0.010 inches and a diameter of about 0.156 inches for a hose fitting having a shank of approximately 0.095 initial diameter but which after knurling has a maximum diameter of between 0.102 and 0.107 inches. The bore through the fitting may be about 0.060 inches whereby the initial wall thickness of the shank before knurling is about 0.0175 inches and after knurling the maximum wall thickness is about 0.0285 inches.

To assemble the fitting 13 to plate 12, the lower end 24 of the fitting is inserted into plate opening 18 from the upper surface 31 and the shank 22 is then press fitted into plate bore 18 until flange 21 is in tight contact with plate face 31, as shown, the flange 21 bending slightly as necessary for making intimate contact throughout its diameter with face 31.

Upon attachment of plate 12 to body 10 by bolts 11, flange 21 will be pressed into tight sealing contact with gasket 14 whereby it is unnecessary that shank 22 be in sealing contact with bore 18.

I claim:

1. A joint comprising a fluid line fitting and a base plate, the base plate having a bore therethrough, the fitting having a bore therethrough and also having a radially outwardly extending flange at one end thereof, the fitting also having a shank adjacent the flange that is press fitted into said plate bore, said flange being in engagement with a face of the plate at a location surrounding said plate bore, and said engagement being maintained by said press fit.

2. The joint of claim 1 in which said flange is about 0.010 inches in thickness so as to be readily bendable for conforming with said face whereby substantially the full area of the flange adjacent said face is in contact therewith.

3. The joint of claim 2 in which said shank is knurled, said knurl comprising ribs and grooves extending axially along said shank and said flange projecting radially beyond said knurl.

4. A joint for a fluid control valve comprising a valve body, a base plate secured to the body, an elastomeric flat sheet gasket of uniform thickness throughout interposed between the plate and body, fluid flow ports through said gasket and plate in alignment with a port in said body, a fluid line fitting having a shank press fitted within the plate bore and having a flange at the inner end thereof between said plate and said gasket and in tight contact with each, said fitting having an axial bore therethrough in alignment with said body and gasket ports, said flange having a flat planar transverse face in contact with said gasket that extends from the fitting bore to substantially the outer diameter of the flange.

* * * * *